United States Patent [19]
Sutter

[11] Patent Number: 5,854,806
[45] Date of Patent: Dec. 29, 1998

[54] MULTI-CHANNEL, RF-EXCITED GAS DISCHARGE LASER

[75] Inventor: Leroy V. Sutter, Irvine, Calif.

[73] Assignee: Domino Printing Sciences PLC, Cambridge, United Kingdom

[21] Appl. No.: 837,315

[22] Filed: Apr. 10, 1997

[30] Foreign Application Priority Data

Apr. 17, 1996 [GB] United Kingdom .................. 9607959

[51] Int. Cl.⁶ ............................................. H01S 3/097
[52] U.S. Cl. ........................... 372/82; 372/92; 372/98
[58] Field of Search ....................... 372/82, 87, 92, 372/95, 61, 65, 98

[56] References Cited

U.S. PATENT DOCUMENTS

| | | | |
|---|---|---|---|
| 4,455,658 | 6/1984 | Sutter, Jr. | 372/82 |
| 4,464,760 | 8/1984 | Sutter, Jr. | 372/82 |
| 4,589,114 | 5/1986 | Sutter, Jr. | 372/82 |
| 4,618,961 | 10/1986 | Sutter, Jr. | 372/82 |
| 4,891,819 | 1/1990 | Sutter, Jr. et al. | 372/82 |
| 5,029,173 | 7/1991 | Seguin | 372/87 |
| 5,648,980 | 7/1997 | Seguin | 372/92 |
| 5,689,523 | 11/1997 | Seguin | 372/82 |

*Primary Examiner*—Leon Scott, Jr.
*Attorney, Agent, or Firm*—Lyon & Lyon LLP

[57] ABSTRACT

The invention relates to a multi-channel RF-excited gas laser device which has an elongate tubular dielectric housing 1. The housing has a common elongate ground electrode 2 therein and a plurality of laser channels 4 defined within and extending along the ground electrode 2 adjacent to an interior surface 3 of the dielectric housing. A laser gas is provided within the dielectric housing and a plurality of RF electrodes 7 are disposed adjacent to and extending along an external surface 8 of the dielectric housing 1. Each RF electrode 7 is disposed in registration with one of the laser channels 4.

8 Claims, 4 Drawing Sheets

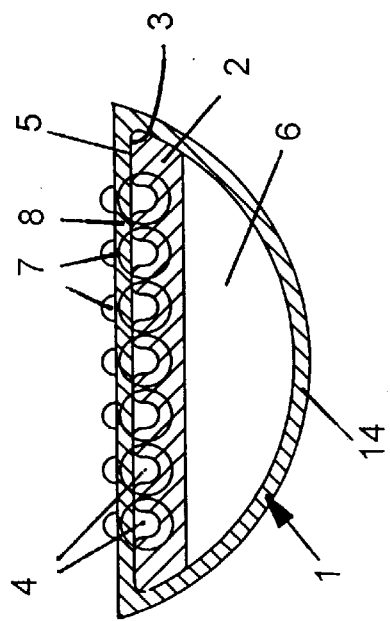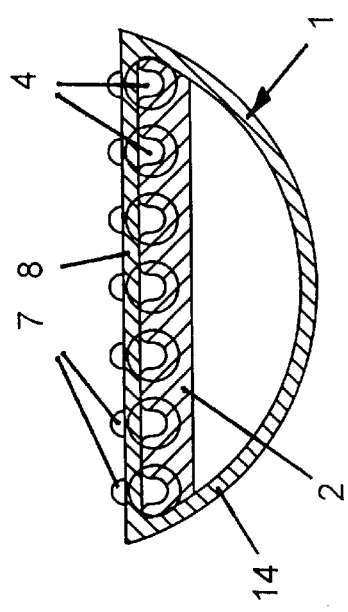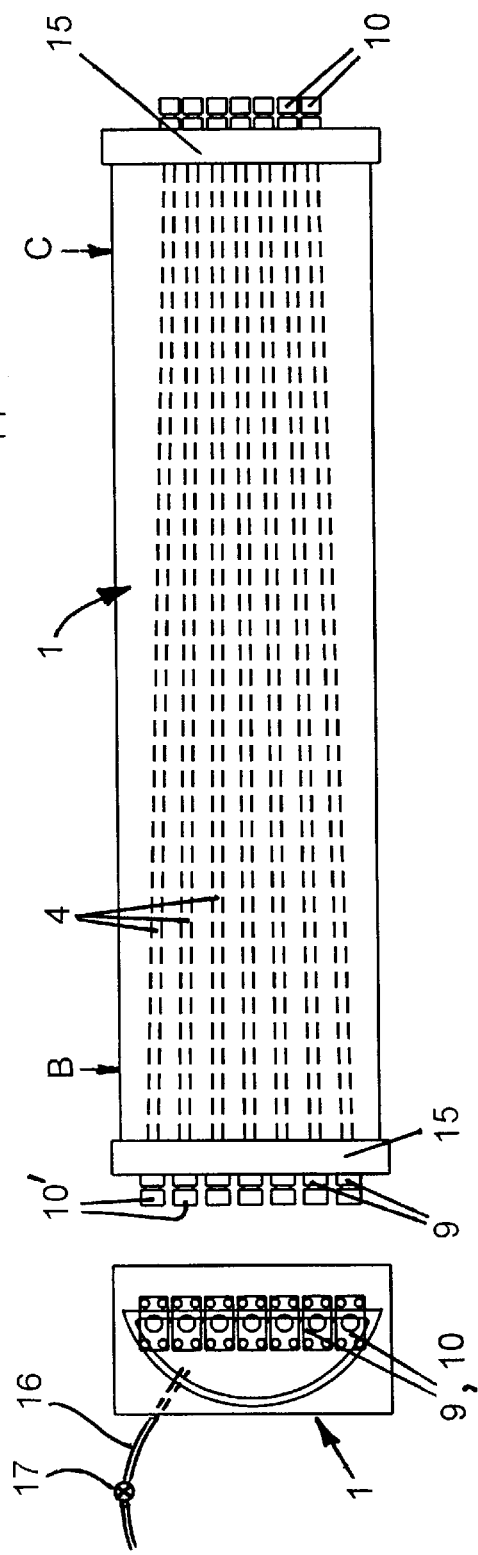

MULTI-CHANNEL, RF-EXCITED GAS DISCHARGE LASER

The present invention relates to a multi-channel RF-excited gas discharge laser and, more particularly, to one having applications in laser marking and coding systems.

In U.S. Pat. No. 4,618,961 Sutter teaches an electrode configuration for use in a gas laser, in which a plurality of electrodes are disposed around a dielectric tube material so as to enable transverse excitation of the laser; various configurations are shown. U.S. Pat. No. 4,891,819 by the same inventor shows RF-excited lasers with internally folded resonators so that RF-excitation can be externally coupled into a slotted cylindrical cavity. Fixed reflecting means enable a compact source of gas laser energy to be provided. In U.S. Pat. No. 5,095,490, the asymmetric configuration of RF-excited gas laser electrodes is disclosed, with a large and asymmetric ground electrode being used in conjunction with narrow and "hot" RF electrodes to produce gas laser discharges in cylindrical dielectric tubes.

U.S. Pat. No. 4,652,722 discloses using a plurality of coherent laser beams in conjunction with a fixed reflector, beam tubes and a focussing lens in order to provide marking indicia or permanent alteration of surfaces on moving substrates.

The present invention is aimed at improving on the production of a series of laser beams wherein higher marking speeds can be obtained in comparison to systems using a single laser beam.

A major cost of producing multi-channel (digital) gas laser marking/coding systems using externally RF-excited gas lasers of the type referred to in the above patent specifications, relates to the expense of grinding miniature and multiple precisely defined optical dielectric tubes and accurately locating them in relation to one another. The present invention also sets out to overcome this problem.

According to the present invention there is provided a multi-channel RF-excited gas laser device comprising an elongate tubular dielectric housing; an elongate ground electrode provided within said dielectric housing; a plurality of laser channels defined within and extending along said ground electrode adjacent to the interior surface of said dielectric housing; a laser gas provided within said dielectric housing; and a plurality of RF electrodes disposed adjacent to and extending along the external surface of said dielectric housing, each RF electrode being disposed in registration with a respective one of said laser channels.

The tubular dielectric housing may have any one of a number of different cross-sectional shapes, for example circular, rectangular and other polygonal cross-sectional shapes may be employed, but, preferably, the dielectric housing has a substantially D-shaped cross-section.

When using a D-shaped cross-section for the dielectric housing, the ground electrode is provided on the planar side of the housing and has a plurality of laser channels machined into its surface, the ground electrode serving the function of the RF electrical ground and providing the optical laser channels for the laser beams to be generated. Such a construction ensures that a precision and reproducible machined surface can be provided, thus ensuring consistency of the laser beam output.

The optical laser channels can be formed parallel to one another within the ground electrode, but preferably are angled towards one another from one end of the dielectric housing to the other. An angled configuration is particularly useful in laser marking and coding systems as an alternative to individually focussed laser beams and allows a single focussing lens to be utilised. With angled laser channels the laser beams can be focussed directly via a single beam focussing system. The use of parallel laser channels will additionally require the use of individual mirrors or lenses to redirect laser beams to the focussing lens system.

Three examples of a laser device according to the present invention will now be described with reference to the accompanying drawings in which:

FIGS. 1A–D illustrate a preferred embodiment in side, left end cross-sectional, right end cross-sectional, and left end views respectively;

Figure 2:
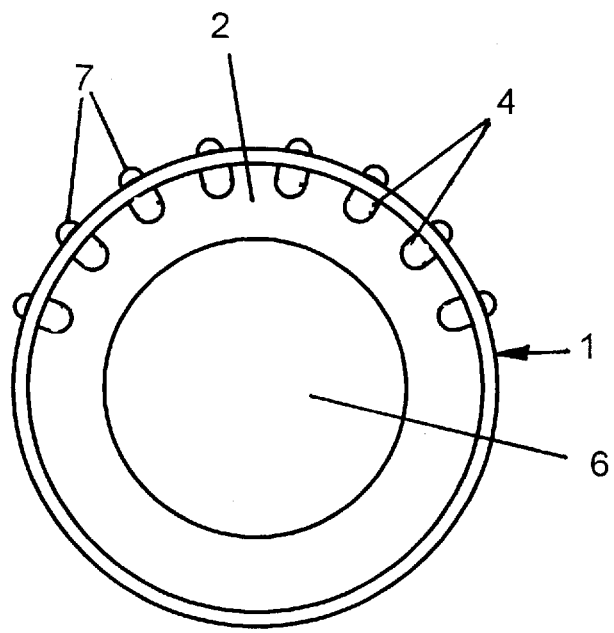
FIG. 2 illustrates the cross-section of a circular cross-section device.

The laser device of FIGS. 1A–D has a dielectric housing 1 having a wall 14 of substantially D-shaped cross-section as best seen in FIGS. 1B and 1C. In an alternative construction, the housing could be rectangular in cross-section. The housing 1 is formed from a gas-impermeable dielectric material such as high density glass ($SiO_2$ base), de-vitrified glass (glass-ceramic) or metal oxide (such as BeO or $TiO_2$), although alumina (polycrystalline sapphire-$Al_2O_3$ is preferred. Housing materials should exhibit low loss to RF energy in the 1.0 MHZ to 1.0 GHz band (as is the case with pure alumina), consistent with the frequency of RF energy to be used as the excitation source. The housing shown has a length of 50 cm, a width of 10 cm, and a depth of 5 cm, with a nominal wall thickness of 4 to 5 mm. With alternative constructions, the wall dimensions may change significantly, although wall thickness is preferably substantially similar.

A machined metal ground electrode 2 (in this example of pure aluminium or aluminium alloy) is provided on the planar internal face 3, bonded or mechanically attached to the wall of the laser housing 1 or to one of two end plates 15. Other metals may be used for the ground electrode, including copper, brass or steels (eg. stainless, Invar or Kovar) with vacuum-plated copper, aluminium, nickel or gold plating. A plurality of elongate optical laser channels 4 are machined or cast into the surface 5 of the ground electrode 2 which abuts the internal planar surface 3 of the housing. As best seen in FIG. 1A, the laser channels 4, which are approximately 2 to 2.5 mm in radius, are angled, at about 0.5° relative angulation, towards one another, but an alternative construction could be employed using parallel channels. For alternative constructions with longer ground electrodes, the angles between the laser channels can be reduced and the minimum radius of the channels can expand proportionally to the square-root of the ground electrode length. Also, the width of the laser housing may need to expand as the ground electrode width is increased as its length is increased to accommodate the laser channel spacing at the end where the laser channels are most closely packed.

A conventional laser gas ballast is provided within the space 6 and individual RF electrodes 7 extend along the outside of the dielectric housing 1, being disposed on the outer planar face 8 of the housing, in registration with the laser channels 4. A series of small holes (1 to 3 mm diameter) may be provided spaced apart 2 to 5 cm, along the length of the laser channels so that ventilation of gas between the laser channels and the ballast volume may occur. These holes act to allow gas to flow into the laser channels from the ballast volume, increasing the laser output power in pulsed-mode operation. Preferably, the laser gas mix for a continuous carbon dioxide laser output at 10.6 µm wavelength would be roughly 12% carbon dioxide, 12% nitrogen and/or carbon monoxide, 5% xenon and 71% helium. This mix can be varied to obtain optimum performance for pulsed laser operation, by increasing the percentage of carbon dioxide. The laser gas is introduced through a sealable tube 16 which can be pinched-off or valved-off through a suitable valve 17, such that the laser housing is sealed. In an alternative construction, a second gas exit tube can be added at the other end of the housing 1 such that flowing gas can be used in the device. The typical gas pressure in the device would be 60 Torr and would vary inversely proportionally to the laser channel radius.

At the end plates 15 of the housing 1 laser optical mounts 9 are provided in conventional manner. At least one of the end plates 15 is electrically connected with the ground electrode 2. The end plates 15 are made of aluminium or aluminium alloy, but could alternatively be made of copper, brass or steels (eg. stainless, Invar or Kovar) with vacuum-plated copper, aluminium, nickel or gold plating. The end plates 15 are sealed to the housing 1 via elastomeric or metallic seals (not shown). Preferably, these are of Viton (an elastomer) or of metallic indium alloy. The end plates 15 are bolted to the housing 1 via suitable clamping devices or long threaded rods (not shown) which provide high compression on the housing to ensure end plate sealing. Alternatively, the end plates 15 could be formed of nickel plated Kovar and brazed to the alumina housing 1 at high temperature.

The optical mounts 9 include resonator mirrors 10, 10' which differ from end to end of the device. At one end, the reflecting mirror is substantially 100% reflective to the laser radiation, for example, being made of polished silicon with enhanced reflective coatings to optimise reflectivity at the desired wavelength (>99% at 10.6 µm) and is of approximate dimensions 6 mm diameter and 3 mm thickness. The coating can be varied to optimise other wavelengths For both carbon monoxide and carbon dioxide lasers (5 to 12 µm). At the other end, the second, opposing, mirror is of similar size, is partially reflective at the desired wavelength (90% to 95%) and is made of zinc selenide with reflection enhancing coatings. Other possible materials are germanium, cadmium telluride and silicon, all with enhanced-reflection coatings. The mirrors are attached to the laser assembly and aligned to the respective laser channels using an optic retainer with attachment screws (preferably three or four per mirror). The mirrors 10 are compressed against an elastomer (eg. Viton) or metallic (eg. indium metal alloy) seal which is supported on the mount 9 which is hermetically bonded to the respective end plate 15 and provides a reference surface for alignment of the resonator optics.

Figure 1E:
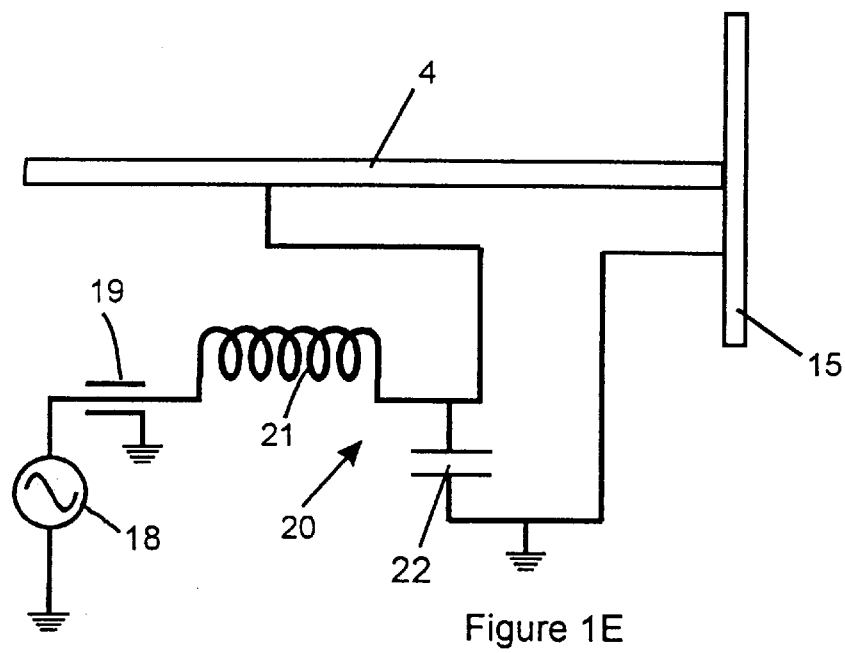
FIG. 1E illustrates, diagrammatically, an RF supply circuit for the laser device of FIG. 1A to 1D.

FIG. 1E illustrates a circuit for providing RF excitation of the laser device. This is obtained by developing a high voltage electric field in each laser channel 4 by means of a high frequency, high voltage electric field on the RF electrodes 7, provided by a 200 to 250 watt RF signal generated at an RF generator 18 and supplied through a 50 ohm RF cable 19 and then converting the signal into high voltage supply via a matching network 20 comprising a series inductance 21 and a parallel capacitor 22. The end plates 15 which is connected to the ground electrode 2 is grounded to the matching network.

The laser device shown in FIGS. 1A to 1E and described above is arranged to produce 10 to 20 watts of laser power at roughly 10.6 µm.

Figure 3:
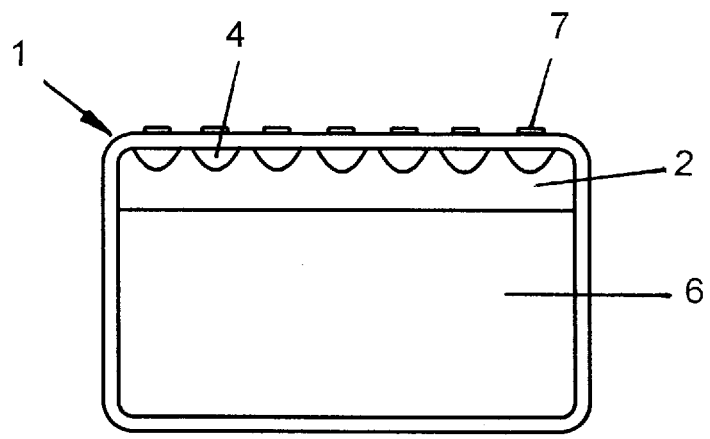
FIG. 3 illustrates a device with a rectangular cross-section.

FIGS. 2 and 3 illustrate alternative geometries for the dielectric housing, with corresponding changes to the structure of the other components. The same reference numerals are used, but it can be seen that, for example, in FIG. 2, wherein the dielectric housing is circular, that the ground electrode 2 is also tubular in form and is provided or formed with optical laser channels 4 over a portion of its circumference. The rectangular design shown in FIG. 3 is more similar to that of FIGS. 1A–D in that the ground electrode 2 has the laser channels 4 formed in one planar face which abuts one of the longer side walls of the rectangular dielectric housing.

Figure 4:
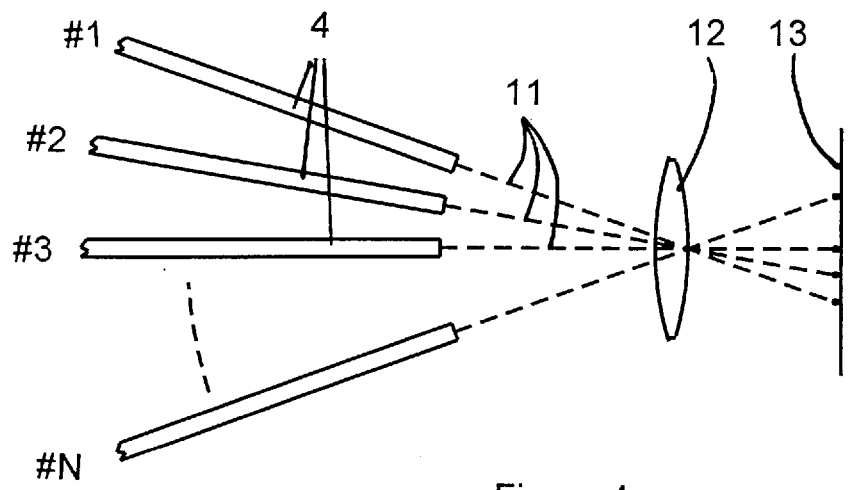
FIGS. 4 and 5 illustrate two beam focussing embodiments.
Figure 5:
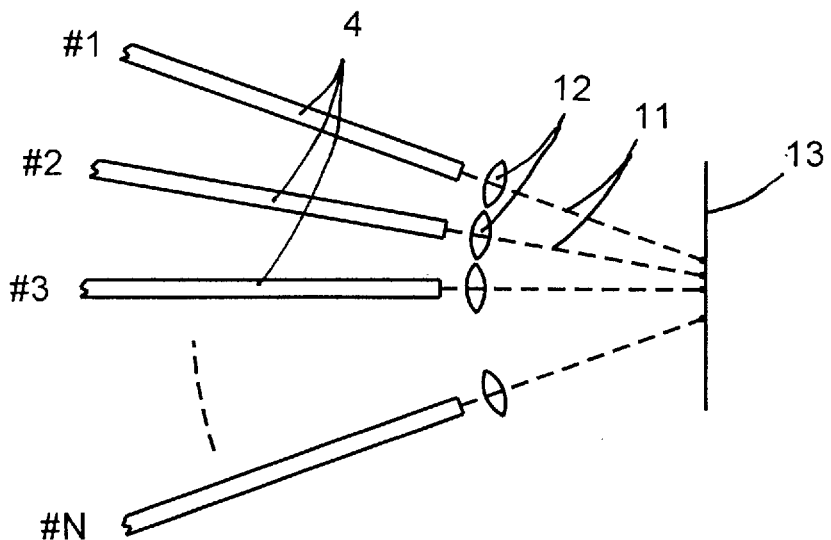

An important feature of multi-channel laser devices used for marking and coding is the beam focussing system employed. FIG. 4 illustrates a first embodiment of a beam focussing system which may be employed with the present invention and FIG. 5 illustrates an alternative. The geometry and configuration and the focal length of the lenses employed determine the dot spacing and dot size of the marks which the lasers emitted from the laser channels can produce, and the separation of the dots, either individually or in groups, can be adjusted by altering the angle between the laser beams at the focussing lenses. FIG. 4 illustrates the first configuration using a single final focussing lens 12 to focus the multiple beams 11 onto a target 13. FIG. 5 illustrates the use of plural final focussing lenses 12 to achieve the same purpose.

Figure 6:
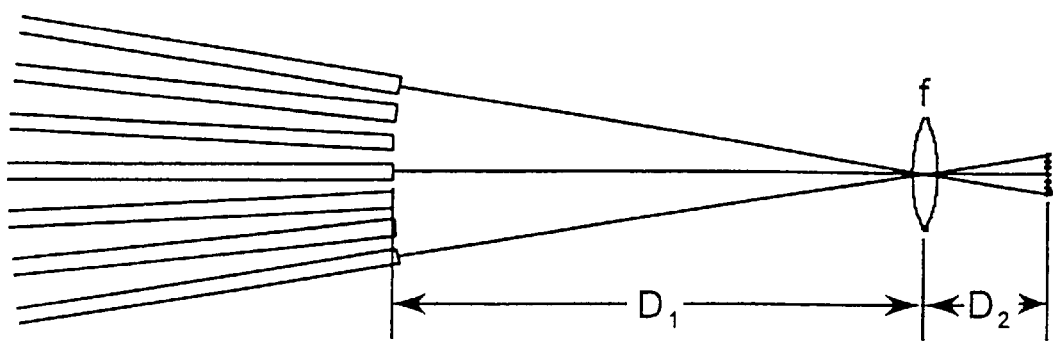
FIGS. 6 and 7 illustrate the geometry of multiple angled lasers and their focussing respectively.

FIG. 6 illustrates the geometry of using a single final focussing lens (as per FIG. 4) with the lens 12 being of focal length f at a distance $D_1$ from the optical end of the laser channels 4, the lens forming a series of focussed laser spots at a near-planar surface a distance $D_2$ from the focussing lens.

Figure 7:
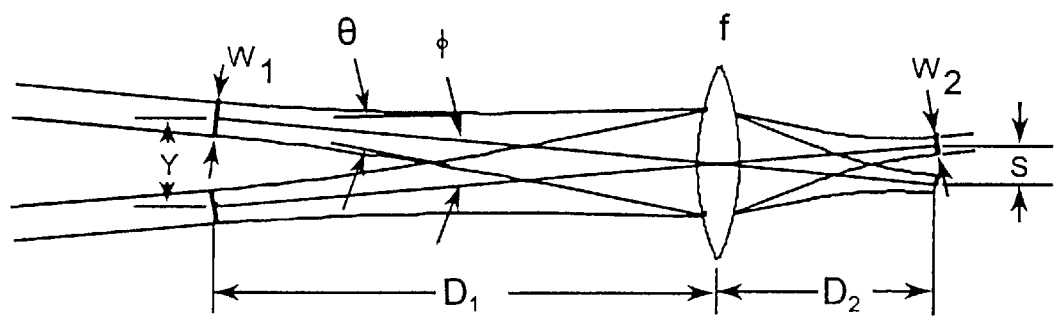

FIG. 7 illustrates the optical configuration of two of a pair of adjacent laser beams of those provided in the system of FIGS. 4 and 6 and illustrates diffraction effects. In FIG. 7, the adjacent pair of laser beams are at an angle φ to each other and are separated on centres at the closest points by a distance Y. Each laser beam exiting the respective laser aperture (of inside diameter $W_1$) expands in the far-field of the exit aperture at angle θ and is focussed by the lens of focal length f to a spot diameter of $W_2$, separated by a distance S from the adjacent spot formed by the adjacent laser beam 11.

The theory of operation will now be described.

According to standard optical theory for lowest order gaussian laser beams, the following calculations can be made.

Firstly, it is given from basic laser theory that the laser beam divergence for a laser beam exiting a laser aperture with a gaussian beam-waist "$W_1$", is given by the relation:

$$\theta \approx (4\lambda)/(\pi W_1)$$

where λ is the wavelength of the light exiting the waveguide and π is the physical constant approximated by the value 3.14159.

For gaussian laser beams focussed through a lens, the following relationships are readily derived and can be found in most standard texts on the subject:

$$W_2 = [(1/W_1^2)(1-(D_1/f))^2 + (1/(f\theta))^2]^{-\frac{1}{2}}$$

and $$D_2 = f + [(D_1-f)f^2]/[(D_1-f)^2 + ((\pi W_1^2)/(4\lambda))^2]$$

Finally for the normal conditions where the angle between laser channels is small, then the value of "tan (φ)" is approximately equal to "φ" so that by simple geometry:

Thus from this set of equations one can derive the focussed spot size "$W_2$", and spot separation, "$S$", for a given set of geometric parameters ("$W_1$", "$D_1$", and $\phi$) and optical parameters ("$f$" and "$\lambda$")

Sample Calculations:

As a sample case, the following is given:

"$\lambda$"=10.6 ×10$^{-4}$(carbon dioxide laser wavelength)

"$f$"=5.0 cm

"$W_1$"=0.40 cm

"$D_1$"=130 cm

"$\phi$"=0.01 radians

Then from these values the following can be derived:

"$\theta$"=0.0337 radians (from Equation 1)

"$W_2$"=0.0116 cm (from Equation 2)

"$D_2$"=5.1 cm (from Equation 3)

"$S$"=0.51 cm (from Equation 4)

The above values would be typical for a seven dot character height of slightly over 3.0 mm where the character height, "H" is equal to:

$$H=(N-1)S+W_2$$

and where "N" is the number of dots which comprise the height of the mark.

Referring to the second beam focussing embodiment shown in FIG. 5, the multiple transmitted laser beams can be focussed onto the target 13 via multiple focussing lenses 12. The geometry of the configuration and the focal length of the lenses determine the dot spacing and dot size of the marks at the target. The separation of the dots, either individually or in groups, can be adjusted by changing the angulation of the laser channels at the focussing lens. The calculations for spot size and spot separation for this embodiment obey the same optical theory previously described for beam focussing embodiment #1 (see Equations 2 and 4 above).

I claim:

1. A multi-channel RF-excited gas laser device comprising an elongate tubular dielectric housing having an inner and an outer surface;

an elongate ground electrode provided within said dielectric housing;

a plurality of laser channels defined within and extending along said ground electrode adjacent to the inner surface of said dielectric housing;

a laser gas provided within said dielectric housing; and a plurality of RF electrodes disposed adjacent to and extending along the outer surface of said dielectric housing, each RF electrode being disposed in registration with a respective one of said laser channels, whereby placement of the RF electrodes along the outer surface of the dielectric housing stabilizes laser discharge and prevents electrical arcing between the electrodes.

2. A laser device according to claim 1, wherein the tubular dielectric housing has a polygonal cross-sectional shape.

3. A laser device according to claim 2, wherein the tubular dielectric housing has a rectangular cross-sectional shape.

4. A laser device according to claim 1, wherein the tubular dielectric housing has a circular cross-sectional shape.

5. A laser device according to claim 1, wherein the dielectric housing has a substantially D-shaped cross-section having a planar side and a curved side.

6. A laser device according to claim 5, wherein the ground electrode is provided on the planar side of the housing and has a plurality of laser channels provided in 3 its surface, the ground electrode serving the function of the RF electrical ground and providing the laser channels for the laser beams to be generated.

7. A laser device according to claim 1, wherein the laser channels are parallel to one another within the ground electrode.

8. A laser device according to claim 1, wherein the laser channels are angled towards one another from one end of the dielectric housing to the other.

* * * * *